Dec. 12, 1967 G. J. WALKEY 3,357,370
PLASTIC SAFETY RAMP
Filed July 1, 1966

INVENTOR.
GEORGE J. WALKEY
BY
*George C. Sullivan*
Agent

United States Patent Office 3,357,370
Patented Dec. 12, 1967

3,357,370
PLASTIC SAFETY RAMP
George J. Walkey, Burbank, Calif., assignor to Lockheed Aircraft Corporation, Burbank, Calif.
Filed July 1, 1966, Ser. No. 562,196
6 Claims. (Cl. 104—275)

ABSTRACT OF THE DISCLOSURE

A ramp having a high strength-to-weight ratio for utilization in aisleways. A plurality of conduits are disposed intermediate the ramp base and top which run the length of the ramp and are suitable for receiving power lines and cables. Filler material of suitable non-flammable, high resistance composition is used within the structure to give greater strength thereto.

---

This invention relates generally to a safety ramp, and more particularly to a ramp with internally mounted conduits for receiving electrical, hydraulic and pneumatic lines.

In working areas wherein pneumatic or power lines, piping, etc. are disposed across aisleways for personnel it is the custom to route such lines in a random fashion along the floor or to tie them together by means of cable connectors. However, when large diameter cables are used or when such lines are grouped together, it is very difficult to move heavy pieces of equipment along the aisleways, particularly those pieces of equipment having small diameter steel wheels. Under these conditions, there is not only the danger of upsetting valuable equipment, but should the cables become damaged by the heavily loaded wheels, the probability of personnel danger, such as by electrocution, is substantially increased.

In addition to the aforementioned problems encountered in moving equipment, the hazard of personnel tripping over these cables is very great. This hazard is compounded when personnel are required to work in limited area work spaces such as inside the fuselage of an aircraft.

One reason that present safety ramps have not heretofore been used to a greater extent is because of their size, weight and difficulty in handling. These restrictions have been at least partly necessitated by the requirement that the ramp accommodate large loads over its outer surface. To overcome these restrictions heavy, cumbersome and generally expensive ramps have been used.

It is therefore an object of this invention to provide a strong, comparatively light weight, easily maneuverable safety ramp for power lines.

Another object of the invention is to provide a means for reducing the hazards of personnel tripping over, or damaging cables.

A further object is to provide a ramp which will resist heat and electrical current from frayed cables and which is shaped to permit easy movement of large equipment across its outer surface.

Other objects and characteristics of the invention appear from the following detailed description of one embodiment thereof taken in connection with the accompanying drawings in which like reference numerals are appended to identical parts in the several figures and in which.

The inventive structure hereinafter described generally resides in the combination of elements defining a base peripherally having an inclined surface diverging from the base, the cover being joined to a top cover means supported by comparatively light weight, rigid material, disposed between the base and the cover, conduits being disposed through that material for receiving cables, hoses and the like. Additional stiffening or support members are usually psoitioned between the base and the cover adjacent the conduit for increased strength.

Figure 1:
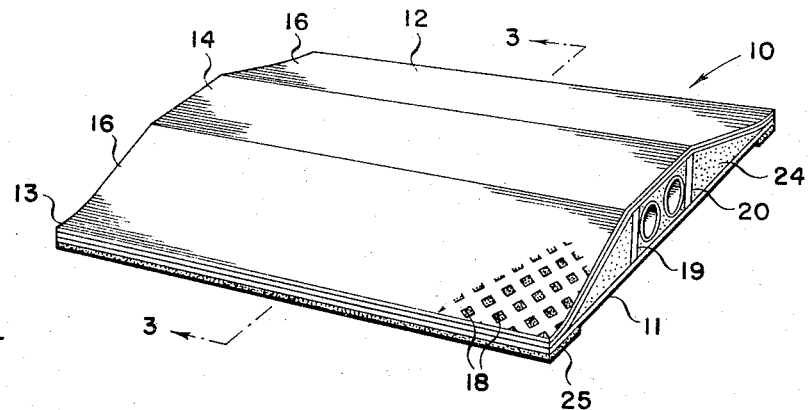
FIGURE 1 is a perspective view illustrating a typical embodiment of the ramp of this invention.

Referring now to FIGURE 1, the subject ramp of this invention is generally indicated at 10. The ramp 10 is constructed such that its base member 11 and its top cover 12 form a lip-like junction 13 at their extremities. The lip 13 has a relatively narrow width and acts cooperatively with the comparatively small angle of incline between the base 11 and the top cover 12, said angle being preferably 15° or less.

The top cover 12 is fabricated from a strong, light weight, rigid material such as an epoxy impregnated fiberglass which allows for ease of forming, while permitting a high strength to weight ratio. The top cover has an intermediate section 14 which is substantially parallel to the base member, and two outer inclined sections 16 diverging from the base.

The base 11 is likewise fabricated from a strong, light weight rigid material such as an epoxy impregnated fiberglass and is preferably attached to the top cover at each lip 13 by means of an epoxy resin.

Figure 3:
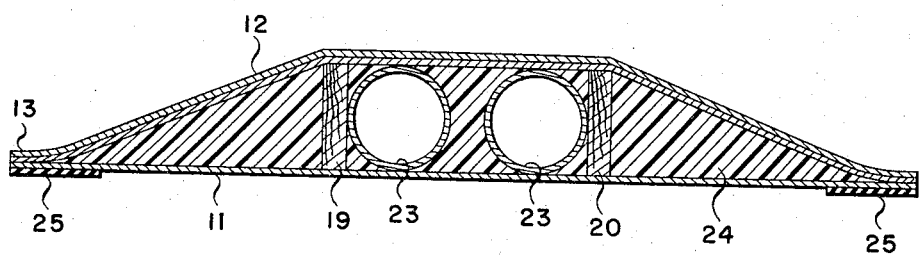
FIGURE 3 is a sectional view taken along lines 2—2 of FIGURE 1 to better illustrate the ramp construction.

Referring to FIGURE 3, the ramp 10 is illustrated in a sectional representation showing the support structure. A cover panel 17 is sometimes mated to the top cover to define an integral composite structure and to provide added structural integrity thereto. It is conventionally attached by suitable means such as an epoxy resin.

The cover panel 17 may be fabricated from a strong, light weight material such as wood, plastic or the like, but is preferably a brightly colored plastic which stands out and thereby gives an added measure of safety to those working in the area. In addition, a plastic and fiberglass combination permits repairs to be made expeditiously without the necessity of welding, soldering or the like, such as by the use of conventional epoxy resins.

For added safety, frictionized pads 18 which may be fabricated from rubber, abrasives, or the like, are firmly positioned on the cover panel 17 to allow for greater traction and less likelihood of accident from slipping on the ramp. These frictionized pads 18 are commercially available and may be applied by conventional means, such as by a suitable adhesive.

The top cover is given added integrity by means of first and second longitudinal support members 19 and 20, which are substantially parallel to the lip 13. In optimizing the strength to weight ratio, the utilization of a high strength wood such as plywood is desirable, although other materials, such as strips of resin-impregnated fiberglass are also usable. These longitudinal support members traverse substantially the entire length of the ramp and may be connected to the base 11 and the top cover 12 by suitable means such as nails, screws, epoxys, or the like.

Figure 2:
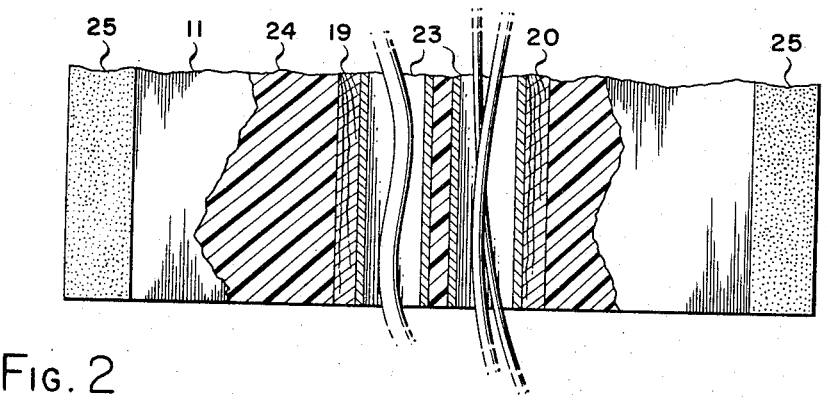
FIGURE 2 is a bottom plan view, partially cut away to show the construction and arangement of the ramp conduits, and cables being positioned within the conduits.

The conduit means 23, for receiving the lines, are formed substantially in the longitudinal direction of the ramp in relatively thick portions thereof, as illustrated in FIGURES 2 and 3.

The conduits 23 are approximately tangent to longitudinal support members 90 and 20 and to the base 11 and top cover 12. They are preferably constructed of a light weight rigid material, such as a cardboard, or plastic, and may be interiorly coated for greater safety with a non-flammable material such as an epoxy resin.

The diameter of the conduits 23 should be sufficiently large to accommodate power lines, for example, such as a 440-volt line and plug, or a group of smaller lines, without allowing them to chaff against the inner wall. However, should an electrical line become frayed or broken, the non-conductive nature of the conduits 23 with their coating would protect personnel working in the area because of their high resistance to electricity and heat.

In order to further strengthen the total structure a filler 24 of suitable non-flammable, high resistance, high strength to weight material such as foamed polyurethane or similar material, is used. The filler 24 additionally insures that the conduits 23 remain at all times in their relative positions with respect to the interior of the ramp.

With the ramp fabricated of the materials described, loads of several thousands of pounds have been and may be sustained using a foam density of 6 to 8 pounds per cubic inch. While heavier loads would certainly be possible with a substitution of materials, such a change would significantly increase the weight of the structure. In the preferred embodiment, the weight is only a few pounds per lineal foot.

As an added safety device, base pads 25, which are fabricated from a resilient non-skid material, are attached to the underside of the base to insure that the ramp does not slip. These pads 25 may be made from rubber, felt or the like, depending upon the type of floor surface on which it is expected to be utilized.

While the invention has been described in detail, it is obvious that others skilled in the art can devise and build alternate and equivalent constructions which are within the scope and spirit of the invention. Therefore, it is intended that protection for this invention be limited not by the construction herein illustrated and described, but only by the proper scope of the appended claims.

I claim:

1. A ramp comprising:
   a base;
   a top cover means connected to said base and enclosing an area therebetween, said top cover means having at least one inclined surface diverging from said base;
   support means disposed between said base and said top cover means for supporting loads on said top cover means;
   conduit means disposed between said base and said top cover means for receiving elements therethrough; and
   filler means disposed throughout the area enclosed between said base and said top cover means, and wherein said filler means is a non-flammable, high resistance, high strength-to-weight material.

2. A ramp as defined in claim 1 including a cover panel attached to and substantially mated with the outer surface of said top cover means.

3. A ramp as defined in claim 1 wherein said conduit means are coated with a means for resisting fire.

4. A ramp comprising:
   a base;
   a top cover means connected to said base and enclosing an area therebetween, said top cover means having at least one inclined surface diverging from said base and wherein said base and said top cover means are epoxy impregnated fiberglass;
   support means disposed between said base and said top cover means for supporting loads on said top cover means; and
   conduit means disposed between said base and said top cover means for receiving elements therethrough.

5. A ramp comprising:
   a base;
   a top cover means connected to said base and enclosing an area therebetween, said top cover means having at least one inclined surface diverging from said base;
   support means disposed between said base and said top cover means for supporting loads on said top cover means;
   conduit means disposed between said base and said top cover means for receiving elements therethrough; and
   filler means disposed throughout the area enclosed between said base and said top cover means and wherein said filler means is a polyurethane.

6. A ramp comprising:
   a base;
   a top cover means peripherally connected to said base and enclosing an area therebetween, said top cover means having at least one inclined surface diverging from said base and where said top cover means and said base longitudinally form a substantially trapezoidal shape;
   support means disposed between said base and said cover means for supporting loads on said cover means, said support means including at least one longitudinal support member attached to said base and to said top cover means;
   conduit means disposed between said base and said top cover means for receiving elements therethrough, said conduit means including at least one passage longitudinally positioned within said ramp and wherein said passage is coated for resistance to heat and fire;
   a cover panel attached to and substantially mated with the outer surface of said top cover means;
   filler means disposed through the area between said top cover means and said base and wherein said filler means is a non-flammable, high resistance, high strength-to-weight material;
   frictionized means attached to said cover panel for preventing slipping; and
   frictionized material attached to the ground engaging side of base to prevent sliding of the ramp.

References Cited

UNITED STATES PATENTS

| | | | |
|---|---|---|---|
| 817,558 | 4/1906 | Heaton | 104—275 |
| 1,914,830 | 6/1933 | Kostohris | 104—275 |
| 2,166,031 | 7/1939 | Wendell | 104—275 |
| 2,299,356 | 10/1942 | Strohm | 104—275 |

ARTHUR L. LA POINT, *Primary Examiner.*

D. F. WORTH, *Assistant Examiner.*